Dec. 10, 1968  J. J. PETHIS  3,415,500
COMBINED SEAL AND SHOCK MOUNT FOR A BEARING
Filed Sept. 21, 1966
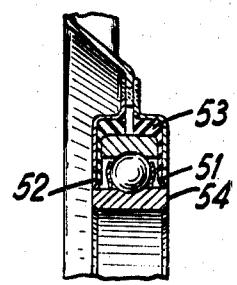
FIG.4
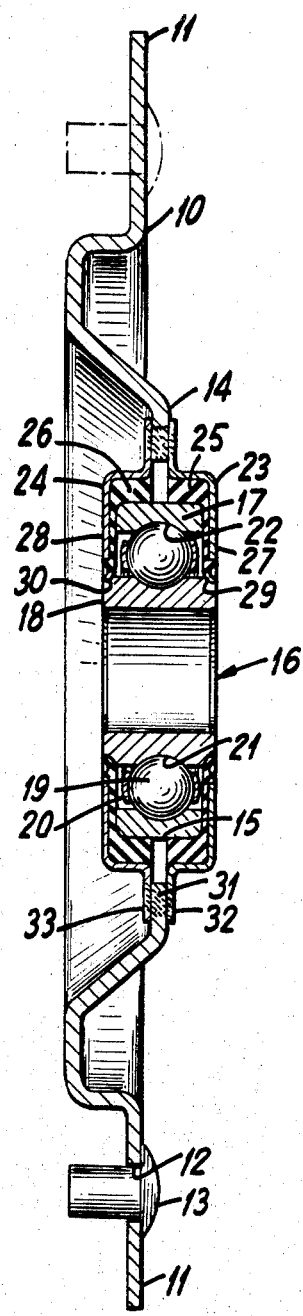
FIG. 1
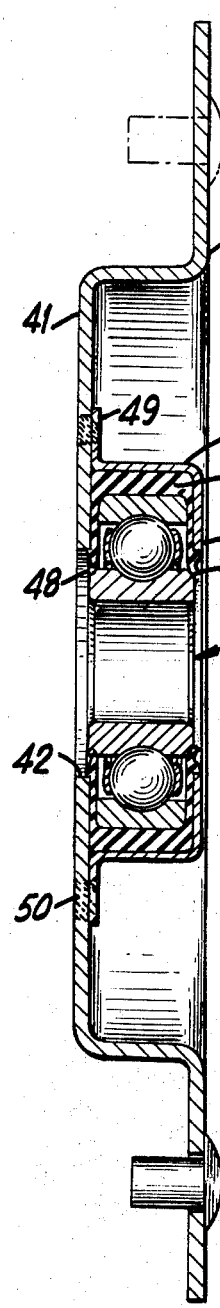
FIG. 2
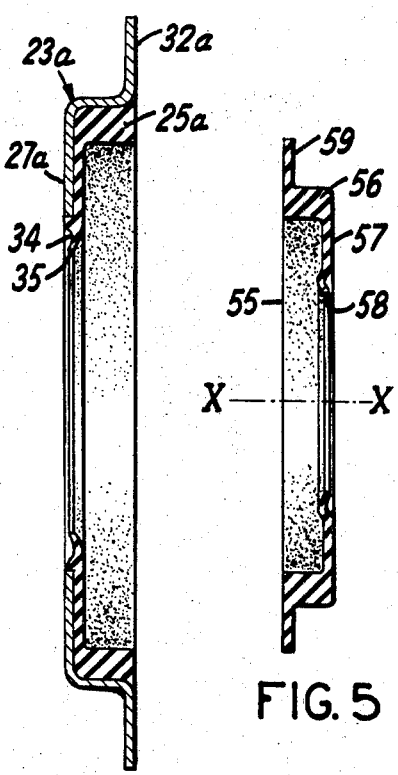
FIG.3
FIG. 5
INVENTOR.
JAMES J. PETHIS
BY
Hopgood & Calimafde
ATTORNEYS.

United States Patent Office

3,415,500
Patented Dec. 10, 1968

3,415,500
COMBINED SEAL AND SHOCK MOUNT FOR A BEARING
James J. Pethis, Farmington, Conn., assignor to The Fafnir Bearing Company, New Britain, Conn., a corporation of Connecticut
Filed Sept. 21, 1966, Ser. No. 581,004
4 Claims. (Cl. 308—184)

ABSTRACT OF THE DISCLOSURE

A bearing assembly is provided comprising a bearing-mounting bracket having a peripheral mounting flange formed with an annular offset located radially from said flange and having an opening centrally located therein, said bracket being sufficiently flexible to yield to axial pressure caused by shock end loading and the like. The assembly includes an antifriction bearing comprising inner and outer annular rings with rolling elements therebetween located coaxially with respect to said centrally located opening, means mounting the bearing to the bracket comprising at least one flanged annular cap supporting the outer ring of said bearing against axial displacement, the flanged annular cap having integrally associated within it an annular shock-absorbing means, said shock-absorbing means supportingly engaging the periphery of the outer bearing ring and extending radially as a thin sealing element along each side of said outer bearing ring in flexing and wiping engagement with the outer periphery of the inner bearing ring, and a peripheral lip extending radially outward from said flanged cap, said peripheral lip being joined along its periphery to said annular bracket, whereby said antifriction bearing is concentric with the opening of said annular bracket.

---

This invention relates to a shock-absorbing mount for anti-friction bearings and, in particular, to a combined seal and shock mount for prelubricated bearings for use with electric motors of the type employed in vacuum cleaners and other home appliances.

Domestic appliance electric motors tend to become noisy during use due to rough handling of the appliance and due to undampened vibrations attending the use of the appliance.

It would be desirable to provide a combination mount and bearing assembly characterized by the ability to absorb and dampen noise and vibration in all planes, such that any dimensional changes of a bearing-supported rotating part arising from variations in temperature can be compensated for by the construction of the mount and bearing assembly combination.

It is the object of this invention to provide a shock resistant and noise dampening housing and bearing assembly combination that can be easily mounted to a domestic appliance electric motor.

Another object is to provide a combined seal and shock mount having in combination therewith an antifriction bearing assembly characterized by vibration or noise dampening of the rotational member, e.g., the shaft, in all planes.

These and other objects will more clearly appear when taken in conjunction with the following description of the invention and the accompanying drawing, wherein:

FIG. 1 is illustrative of one embodiment of the invention showing the combination of a shock mount and an antifriction ball bearing assembly;

FIG. 2 depicts another embodiment of the invention providing substantially the same characteristics of FIG. 1;

FIG. 3 shows a rubber bonded flanged cap which may be used with another in constructing one embodiment of a shock-resisting mount exhibiting dampening in all planes;

FIG. 4 is illustrative of a still further embodiment of a combination shock mount and ball bearing assembly; and FIG. 5 depicts another embodiment of a flanged cap made wholly of shock-absorbing material, such as hard rubber or thermoset plastic material.

In its essentials, the cooperating parts making up the device provided by the invention comprise a bearing-mounting bracket having a peripheral flange for mounting to the framework of an appliance relative to a motor, the bracket having an annular offset located radially inward thereof, the annular offset having an opening centrally located therein. An antifriction bearing having inner and outer annular rings with rolling elements therebetween is provided coaxially located with respect to the centrally located opening of the offset. Means are provided mounting the bearing assembly to the bracket comprising at least one flanged cap adapted to support the outer ring of the bearing assembly against axial displacement, the flanged cap having integrally associated within it around the inner periphery and radially inward along the sides an annular shock-absorbing means, for example elastomeric material, such as Buna N rubber, or curable material, such as hard rubber or plastic, which together with the cap supportingly encompasses the outer bearing ring to provide resistance to shock and/or vibration in both the radial and axial direction. For mounting purposes, the flanged cap has a peripheral extension or lip which projects radially outward, the lip being rigidly joined along its peripheral side face to the annular bracket offset, whereby to maintain the antifriction bearing in concentric relation to the opening of the bracket offset.

Referring to FIG. 1, a combined shock mount and antifriction ball bearing assembly is shown comprising a bearing-mounting bracket 10 of preferably pressed sheet metal having a peripheral mounting flange 11 in which bolt-receiving holes 12 are provided positioned, for example, 120° apart, said holes being adapted to receive a bolt 13 for mounting said bracket and its supported bearing to the framework of an appliance relative to the motor shaft. The bracket is sufficiently flexible to yield to axial pressure caused by shock end loading and the like. As will be noted, the bracket has located radially inward from the flange an annular offset 14 having an opening 15 centrally located therein. Supported within the opening is an antifriction bearing assembly designated generally by the numeral 16, said bearing assembly comprising an outer annular ring 17 spaced concentrically from an inner annular ring 18, said rings defining an annular space having supported therein a less than full complement of bearing balls 19 held in position by a cage 20, the ball riding in raceway 21 of the inner ring and complementary raceway 22 in the outer ring.

Encompassing the outer ring is a pair of annular flanged caps 23, 24, each of which has bonded to the inner surface thereof an annular shock-absorbing grommet 25, 26 of elastomeric material such as Buna N rubber, the grommet also extending radially along the vertical walls 27, 28 of the dished caps to provide a seal which extends to and wipingly contacts annular rabbets 29 and 30 of the inner ring. As will be apparent, the annular elastomeric grommet supportingly engages the peripheral surface of the outer bearing ring as well as engages the side faces of the ring. Thus, the grommet provides dampening in all planes.

Each of the flanged caps has a peripheral lip 32 and 33 extending radially outward, each of which is attached to opposite faces of the annular offset at 31 by means of spot welding or other suitable fastening means, such that bearing assembly is supported substantially concentrically to the opening of the annular offset 14.

One of the annular flanged caps employed in the embodiment of FIG. 1 is designated in FIG. 3 by the numeral 23a, said cap having bonded internally thereof an annular grommet 25a of elastomeric material, such as Buna N rubber or the like. Preferably, the elastomeric material is one having a durometer range of about 40 to 70. The grommet is thickened at its periphery and extends down along the wall 27a of the cap to provide a preformed flexible seal lip 34 which extends to and in wiping engagement with an annular rabbet of the inner ring. A lip 32a extends radially outward from the flanged cap, the lip serving as means for attaching the caps to the bracket as shown in FIG. 1.

In the embodiment depicted in FIG. 2, a mounting bracket 40 is shown having an annular offset 41 with an opening 42 centrally located therein having coaxially associated therewith a ball bearing assembly 43 similarly as in FIG. 1, except that the bearing assembly is supported adjacent one side of the opening, the bearing being mounted to the annular offset by a single flanged cap 44, having an annular grommet of elastomeric material 45 mounted internally thereof, the grommet extending down along vertical wall 46 and along the wall of 41 of the annular offset of the bracket to provide seals 47, 48 which extend to and wipingly engage the annular rabbets of the inner ring. The cap has a radially extending lip 49 which is used to attach the cap and its supported bearing to the side wall of the annular offset of the bracket by spot welding 50 or other means of fastening. The cap here employed with its mounted grommet supportingly encompasses the periphery of the outer ring, whereas in FIG. 1 this is accomplished by using a pair of oppositely mounted flanged caps 23 and 24.

I show in FIG. 4 another embodiment similar to FIG. 1 except that seals 51 and 52 extending downwardly from grommet 53 ride on the O.D. of inner ring 54 instead of on annular seal rabbets as in FIGS. 1 and 2.

It is preferred that the bearing mounting bracket designated in FIGS. 1 and 2 as 10 and 40, respectively, be sufficiently flexible to yield elastically to axial pressure so as to reduce the possibility of bearing damage due to shock and loading and the like.

As another preferred embodiment, the flanged cap and grommet may be formed as a unitary structure from a curable material, such as rubber or thermosetting plastic, the radially extending seal portion being adapted to engage the outer surface of the inner ring at either the O.D. (FIG. 4) or annular seal rabbets as shown in FIGS. 1 and 2. A flanged cap of the foregoing type is shown designated in FIG. 5 by the numeral 55. The annular wall 56 which is thickened serves as the shock-absorbing grommet portion, although it is a structural part of the flanged cap itself. The annular end wall 57 of the cap extends radially towards center line X—X as shown and terminates into an annular seal portion 58 which is adapted to flexingly engage the O.D. of the inner ring or annular rabbets formed into the surface of the inner ring. A peripheral mounting lip 59 extends radially outward from the flanged cap, the lip serving as means for attaching the cap or caps to the brackets illustrated in FIGS. 1 and 2 by suitable means, such as rivets or the like, care being taken to avoid damaging the mounting lip. Examples of plastics which may be employed in making the flanged cap of FIG. 5 are nylon, the acrylics and the like.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. In a bearing assembly, a bearing-mounting bracket having a peripheral mounting flange formed with an annular offset located radially inward from said flange and having an opening centrally located therein, said bracket being sufficiently flexible to yield to axial pressure caused by shock end loading and the like, an antifriction bearing comprising inner and outer annular rings with rolling elements therebetween located coaxially with respect to said centrally located opening, means mounting said bearing to said bracket comprisng at least one flanged annular cap supporting the outer ring of said bearing against axial displacement, said flanged annular cap having integrally associated within it an annular shock-absorbing means, said shock-absorbing means supportingly engaging the periphery of the outer bearing ring and extending radially as a thin sealing element along each side of said outer bearing ring in flexing and wiping engagement with the outer periphery of the inner bearing ring, and a peripheral lip extending radially outward from said flanged cap, said peripheral lip being joined along its periphery to said annular bracket, whereby said antifriction bearing is concentric with the opening of said annular bracket.

2. The bearing assembly of claim 1, wherein the outer annular ring is supported within the opening of the annular bracket, wherein two flanged caps encompass the outer bearing ring from each side thereof, each of said caps having bonded to its dished surface an annular shock absorber of elastomeric material supportingly embracing the outer bearing ring, and wherein each of said flanged caps has a peripheral lip extending radially outward and joined to each side of said annular offset.

3. The bearing assembly of claim 1, wherein each of the sealing elements ride in wiping engagement with annular rabbets located on each side of the inner ring.

4. The bearing assembly of claim 1 wherein the flanged annular cap is made of shock-absorbing material selected from the group consisting of hard rubber and thermosetting plastics.

References Cited

UNITED STATES PATENTS

| 2,653,063 | 9/1953 | Arndt et al. | 308—184 |
| 2,826,464 | 3/1958 | Hawk et al. | 308—184 |
| 3,090,628 | 5/1963 | Giulietti | 308—187.2 |
| 1,451,523 | 4/1923 | Benson | 308—189 |

FOREIGN PATENTS

| 646,103 | 11/1950 | Great Britain. |
| 960,611 | 6/1964 | Great Britain. |

MARTIN P. SCHWADRON, *Primary Examiner.*

FRANK SUSKO, *Assistant Examiner.*